United States Patent
Eberle et al.

(10) Patent No.: US 6,848,644 B2
(45) Date of Patent: Feb. 1, 2005

(54) BELT TENSIONER

(75) Inventors: Walter Eberle, Hochdorf (DE);
Christian Gruber, Stuttgart (DE);
Markus Woldrich, Ditzingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/358,918

(22) Filed: Feb. 5, 2003

(65) Prior Publication Data
US 2004/0021029 A1 Feb. 5, 2004

(30) Foreign Application Priority Data
Feb. 5, 2002 (DE) .......................................... 102 04 477

(51) Int. Cl.$^7$ ................................................ B60R 22/46
(52) U.S. Cl. .................... 242/390.8; 242/374; 280/806
(58) Field of Search ........................... 242/390.8, 390.9, 242/374; 280/806, 807; 180/268; 297/478

(56) References Cited

U.S. PATENT DOCUMENTS

| | | | | |
|---|---|---|---|---|
| 6,427,935 B1 | * | 8/2002 | Fujii et al. ................ | 242/390.9 |
| 6,616,186 B1 | * | 9/2003 | Midorikawa et al. ....... | 280/806 |
| 6,726,249 B2 | * | 4/2004 | Yano et al. ............... | 242/390.9 |
| 2001/0004997 A1 | * | 6/2001 | Yano et al. ............... | 242/390.8 |
| 2002/0017584 A1 | * | 2/2002 | Specht ..................... | 242/390.9 |

FOREIGN PATENT DOCUMENTS

| | | | |
|---|---|---|---|
| DE | 3938081 A1 | * | 5/1991 |
| DE | 4112620 A1 | * | 5/1992 |
| DE | 19501076 A1 | * | 7/1996 |
| DE | 10013870 A1 | * | 10/2001 |

\* cited by examiner

Primary Examiner—John M. Jillions
(74) Attorney, Agent, or Firm—Kenyon & Kenyon

(57) ABSTRACT

In a belt tensioner of a seat belt in a vehicle, in particular a motor vehicle, a retraction device, which is driven by a motor and has a retraction force that is controllable as a function of parameters, is provided for retracting the belt.

15 Claims, 2 Drawing Sheets

BELT TENSIONER

CROSS-REFERENCE TO RELATED APPLICATION

The present application claims priority to Application No. 102 04 477.5, filed in the Federal Republic of Germany on Feb. 5, 2002, which is expressly incorporated herein in its entirety by reference thereto.

FIELD OF THE INVENTION

The present invention relates to a belt tensioner of a seat belt for an occupant on a seat in a vehicle, e.g., a motor vehicle. The belt tensioner may include:

retraction device for automatically shortening the belt;

an extraction lock of the belt, acting in response to predetermined parameters, in particular predetermined deceleration or acceleration of the vehicle or its body, and/or the exceeding of a predetermined extraction speed of the belt; and an irreversible tensioning device, which irreversibly tightens the belt with a powerful force, e.g., 4000 N, for a short period of time, e.g., 10 to 20 ms, in response to receiving a crash signal that may be generated by a sensory system, e.g., a signal for airbag activation.

BACKGROUND INFORMATION

In standard belt tensioners presently used in motor vehicles, the retraction device is operated by a spiral spring, which has a design-based initial tension when the belt is extracted, and is increasingly tensioned according to its spring characteristic as the belt is pulled out.

The extraction lock operates with mechanical catch members. On one hand, these are controlled by inertial members, which are displaced from an inactive catch-bolt position to an active catch-bolt position, when forces acting on the vehicle body produce a body acceleration or deceleration that exceeds a low threshold value. On the other hand, centrifugal-force members are displaced from an inactive catch-bolt position to an active catch-bolt position, when a reel used for receiving the belt is rotated in the extraction direction of the belt, at an angular acceleration exceeding a threshold value or in a jerky manner. This ensures that the belt is restrained from being pulled out (further) in driving situations tending to be dangerous, or even in crashes.

In view of the fact that drivers and/or, in particular, passengers of a vehicle may assume a position outside of the normal or desired sitting position, the seat-belt tensioners, at least those in higher-quality vehicles, are assigned irreversible tensioning devices, which typically function and are triggered in a pyrotechnic manner, when a corresponding sensory system "reports" a collision of the vehicle or activates an airbag present in the vehicle. These irreversible belt tensioners are used to shorten the seat belt, using a large force. In this manner, any belt slack at the body of the occupant, as well as at or on the reel of the belt, is eliminated, and the optimum safety of the specific occupants from possible secondary collisions is even ensured after a previously activated airbag relaxes. In any case, the occupant is kept away from hard structural members of the vehicle body as much as possible.

The irreversible tensioning device may be positioned at a limit stop of the belt, on the seat-belt buckle, or on the belt retractor.

To improve comfort, German Published Patent Application No. 39 38 081 describes assigning an electric motor to the spring provided for actuating the retracting device, in order to adjust or move the relatively stationary retainer of the return spring. In this manner, the belt tension may be changed, and in particular, the tension of the belt may remain low and the wear comfort may be improved accordingly, even when the belt is pulled out very far, as is necessary in the case of above-average height or corpulence of the occupant. As soon as the belt is retracted for rolling it up, the relatively stationary retainer is returned by the abovementioned motor to a starting position, so that the belt may be rolled up safely.

Similar arrangements are the subject matter of German Published Patent Application No. 41 12 620 and German Published Patent Application No. 195 01 076.

German Published Patent Application No. 100 13 870 describes that one can reversibly increase the belt tension, when a sensory system signals a dangerous driving condition. This prepares the belt for a crash of the vehicle.

It is an object of the present invention to improve the tightening of the belt with regard to aspects of both safety and comfort.

SUMMARY

The above and other beneficial objects of the present invention may be achieved by providing a belt tensioner as described herein.

The foregoing object of the present invention may be achieved in a belt tensioner, in which, in order to operate the retraction device, it is/may be connected, by two parallel clutches, to a retraction motor so as to be able to be driven by it, the retraction motor being able to be switched over between two power ranges, and the one clutch functioning with a limited frictional connection, which may only allow the transmission of a small force or small torque, and the other clutch normally being open and closing in response to the high power range of the retraction motor being switched on.

In this context, it may be provided, that the retraction motor is only switched to the high power stage and/or runs in its low power stage at a power that is variable as a function of parameters, in response to a danger signal. A minimum power may be set as long as it may be deduced from signals of a sensory system, that the occupant is sitting in a desired position.

The present invention is based on the concept of providing a motor-driven retraction device, which is, on one hand, able to run at high power, in order to be able to tighten the belt in a dangerous situation detected by sensors, so that any slack present in the belt may be completely retracted and the belt may always be pre-tightened, before a crash may result from the dangerous situation.

Therefore, the reversible belt-tightening of the present invention may ensure, on one hand, markedly increased safety. In particular, the irreversible tensioning device may act even more rapidly, so that, in the event of a crash, the occupant may be held very early by the belt, i.e., the belt tension is prepared for the crash.

On the other hand, the controllable retraction motor may allow the option of ensuring a particularly high level of comfort in normal driving situations, in that the motor is only set to produce a very small retraction force. This may be set so low, that the occupant virtually does not notice the belt. This retraction force may be moderately increased in response to any movements of the occupant, in order to improve any necessary retraction of the belt.

Inertial effects of the retraction motor and, in particular, friction occurring in a transmission normally assigned to the retraction motor may not allow the seat belt to be easily pulled out in opposition to the running retraction motor, or by reversing the direction of rotation of the retraction motor. This difficulty may be eliminated by the present invention, since, when the belt is pulled out, only the frictional connection of the first clutch has to be overcome, as long as the retraction motor is operating at its low power stage, i.e., in normal operation.

As a result, the present invention therefore may ensure that, during normal operation, the belt is only slightly tightened, may be pulled out in opposition to comparatively low resistance, and is retracted by a motor, using a moderate force that puts emphasis on comfort.

On the other hand, a sharply increased belt tension may be immediately set in a dangerous situation, so that the belt system is "prepared" for a possible crash.

All of these functions may be implemented by the retraction drive of the present invention.

According to an example embodiment of the belt tensioner of the present invention, the second clutch is arranged as a gradient clutch, which automatically closes when the clutch input on the side of the retraction motor is moved at a speed exceeding a threshold value, and/or a rotational-speed or speed difference exceeding a threshold value occurs between the clutch input and output. This closed state of the second clutch is maintained as long as force transmission or torque transmission occurs, i.e., the clutch may only open when the force transmission or torque transmission disappears.

In addition, or alternatively, it is also possible to open the clutch by counterclockwise rotation of the motor, i.e., by having the motor run briefly in the direction opposite to the belt-tensioning direction.

In any case, simple arrangements may reliably ensure that the second clutch closes in response to the switching-on of the high power stage of the retraction motor and opens in response to the switching-over to the low power stage.

Regarding the features of the present invention, reference is also made to the subsequent explanation of the drawings, on the basis of which an example embodiment of the present invention is described in detail.

DETAILED DESCRIPTION

Figure 1:
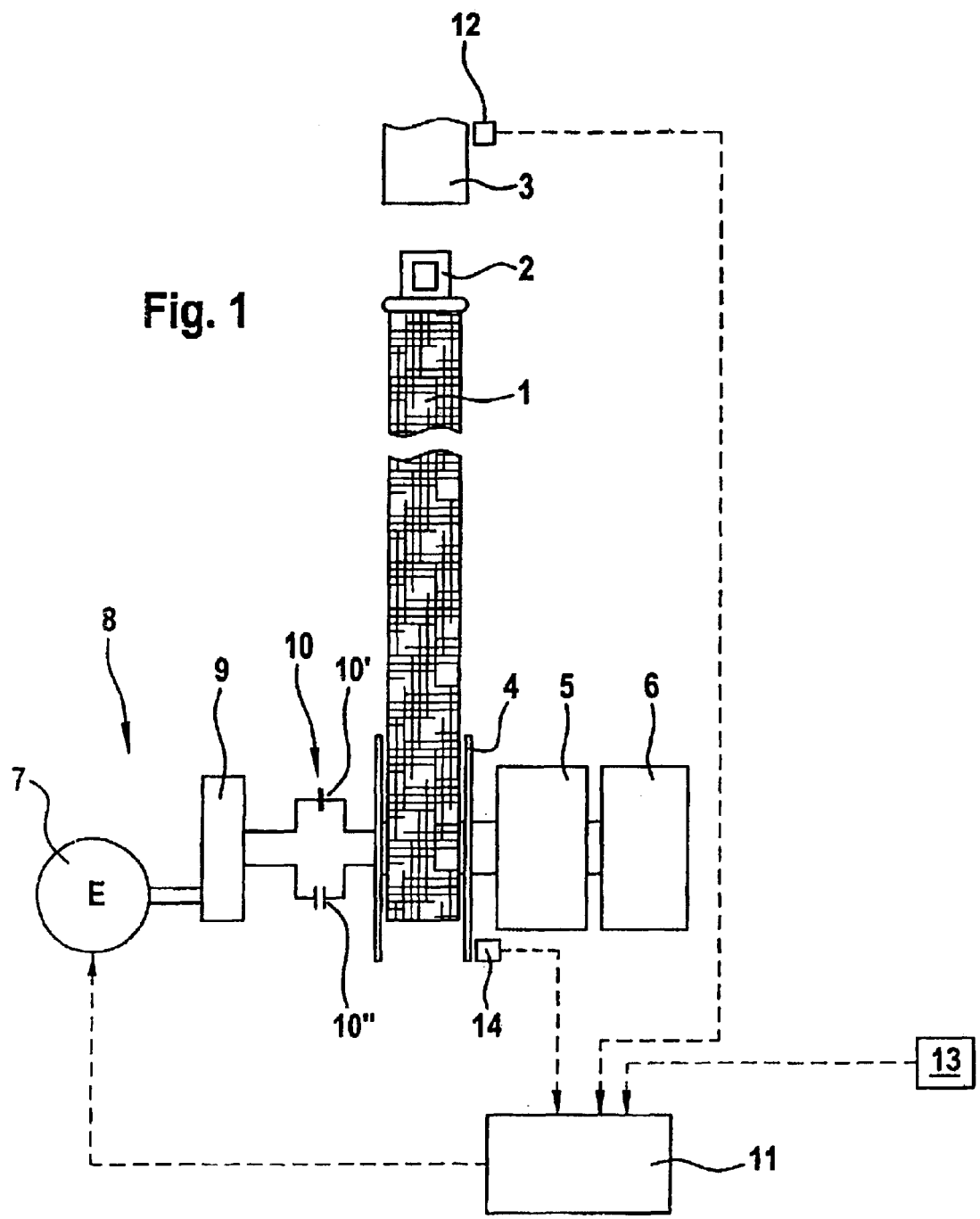
FIG. 1 is a schematic view of an example embodiment of a belt-tensioning system according to the present invention.

As illustrated in FIG. 1, a seat belt 1 includes a buckle latch 2, which is attached to it and may be inserted into a belt buckle 3 or separated from belt buckle 3 in a conventional manner. Seat belt 1 is rolled up onto a reel 4 in such a manner, that seat belt 1 has, in each instance, the desired or required length. This is represented below in further detail.

Reel 4 is assigned a mechanical extraction lock 5 in a conventional manner, which blocks reel 4 from rotating in the unwinding direction of seat belt 1, when the rotational speed of reel 4 and/or the acceleration or deceleration of the vehicle in which seat belt 1 is mounted exceeds a threshold value.

In addition, reel 4 may be assigned an irreversible tensioning device 6, which functions and is fired pyrotechnically in a conventional manner, when a vehicle sensory system detects a collision or a directly imminent collision of the vehicle. In this case, tensioning device 6 irreversibly tightens the belt, using a very powerful force, e.g., 4000 N. This allows the occupant secured by seat belt 1 to be held on his seat in a desired sitting position and, in this manner, to be protected from collisions with the interior parts of the vehicle to a particular extent.

In addition, reel 4 is assigned a retraction device 8, which is in parallel with extraction lock 5 and is driven by a motor, e.g., electric motor 7, and by which a torque is applied to reel 4 in the winding-up direction, in order to keep the seat belt at the currently required length.

The drive connection between electric motor 7 and reel 4 is accomplished by a transmission 9, e.g., a belt transmission, as well as a clutch arrangement 10, which may be functionally represented by two clutches 10' and 10" positioned in parallel to each other. Clutch 10' may always be closed, but may only transmit a very limited torque corresponding to a maximum belt tension of 5 N. As far as magnitude is concerned, clutch 10" is able to transmit markedly higher torques or virtually as high a torque as is desired, but is normally open and only closes when retraction motor 7 is switched to a specified, increased power stage.

A control circuit 11, which is connected on the input side to a sensory system for different operating parameters, is used to control the power output of electric motor 7.

This sensory system may have a buckle-side sensor 12, the signal of which indicates whether or not buckle latch 2 is inserted into belt buckle 3.

In addition, a sensor arrangement 13 is provided, which allows for the detection of driving situations that are dangerous or tend to be dangerous. For example, sensor arrangement 13 may detect the operation of the accelerator and brake pedal, the operation of a brake assist device, as well as the fluid pressure in the brake system, and therefore the operating state of the vehicle brake. In addition, or as an alternative, sensor arrangement 13 may also detect vehicle accelerations and decelerations.

Furthermore, a rotary transducer 14 or another sensor may be provided, the signals of which reveal if reel 4 of seat belt 1 is being rotated, and/or whether seat belt 1 is being moved in the retraction or extraction direction.

The control circuit operates as follows:

It is initially assumed that sensor arrangement 13 is not signaling a dangerous condition. In addition, the occupant is assumed to have sat in the normal sitting position and to have buckled up. Control circuit 11 may ascertain this state from the signals of sensor 12 at the belt buckle and sensor 14 at the reel, and save it as the "normal" extraction length of the belt. Electric motor 7 is controlled in such a manner, that a small torque is generated in the retraction direction of the belt. This torque is transmitted by constantly closed clutch 10' to reel 4, which accordingly applies a retraction force of, for example, 2 N to the seat belt.

If the occupant leans forward at a moderate speed, seat belt 1 is correspondingly pulled out, whereby clutch 10' slips and the extraction resistance of the seat belt is limited to, e.g., 5 N. During the described forward motion of the occupant, electric motor 7 is therefore not pulled along by reel 4 in the extraction direction of seat belt 1, so that, accordingly, relatively high self-locking forces of transmission 9 or motor 7 do not have to be overcome as well.

The above-mentioned motion of the occupant, which was signaled by sensor 14, may result in control unit 11 temporarily driving motor 7 in the retraction direction of the belt, using a slightly increased torque. This may ensure that seat belt 1 effectively follows the occupant, when he or she moves from the forward-leaning position temporarily assumed, back into his normal position.

After a predefined time span following the last belt movement signaled by sensor 14, or when the "normal" extraction length of the belt is reached again, motor 7 may be adjusted back to the above-mentioned, particularly low torque, in order to keep the belt tension appropriately low and ensure particularly high wearing comfort for the occupant.

If, during the drive, sensor arrangement 13 signals a dangerous driving state or one tending to be dangerous, e.g., a driving state in which the brakes are applied more vigorously, then control circuit 11 switches motor 7 over to a high power range in the retraction direction of seat belt 1, whereby clutch 10", which is arranged to transmit large torques and is normally open, simultaneously closes. Seat belt 1 is therefore retracted by a large force, e.g., 150 N or more. This may ensure that seat belt 1 is stretched tight against the body of the occupant and, in particular, that any slack possibly present in the seat belt is retracted as rapidly as possible. If a crash does actually occur, this consequently may ensure that the occupant falls into an effectively tightened seat belt 1. Thus, seat belt 1 may offer optimum protection.

When buckle latch 2 is released from belt buckle 3, sensor 12 generates a corresponding signal. This may result in control circuit 11 again controlling motor 7 in such a manner, that it operates in its low power range in accordance with an opened clutch 10", but with a somewhat increased torque, in order to roll up the seat belt rapidly and completely.

Figure 2:
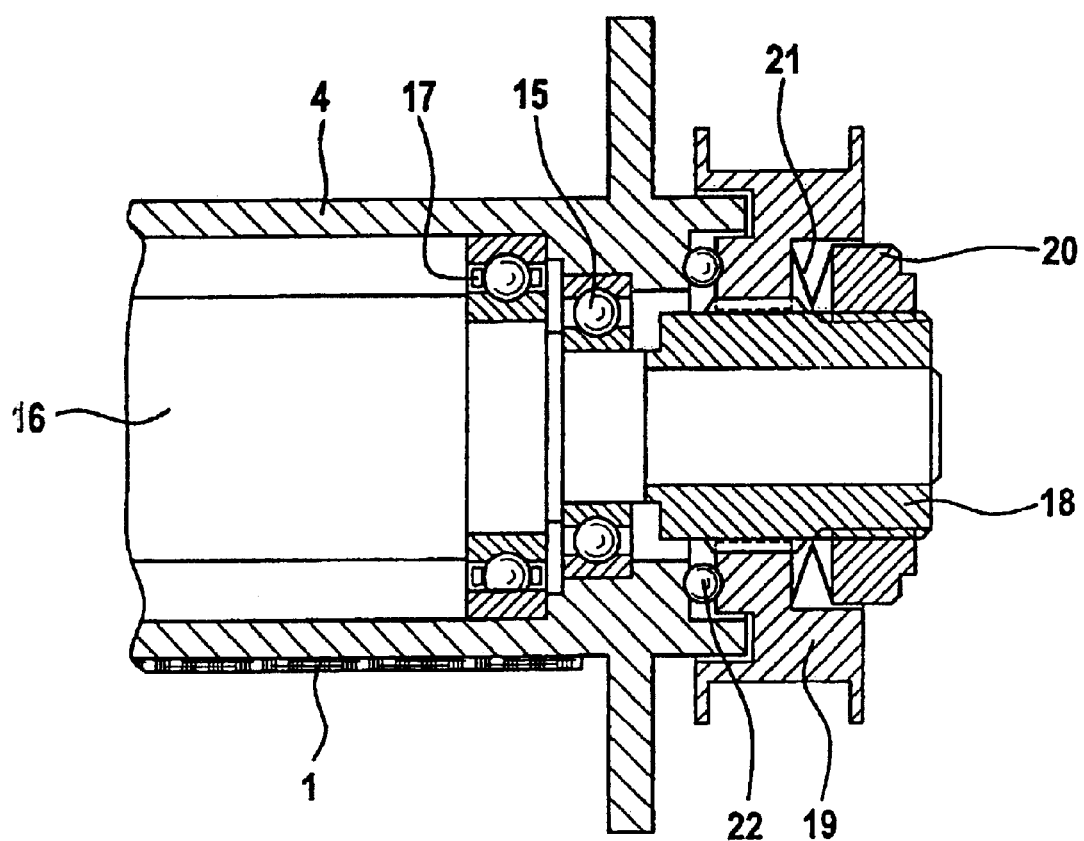
FIG. 2 is an axial cross-sectional view of a clutch arrangement, having a first clutch, which functions with limited force transmission, as well as a second clutch in parallel to it, which is normally open and opens in response to increased rotational-speed differences between the input and output of the clutch.

FIG. 2 illustrates an example of how reel 4 may be coupled to the output of transmission 9.

Reel 4, of which only a cutaway view is illustrated, is pivoted on a shaft 16 by a grooved ball bearing 15. The bearing shells of grooved ball bearing 15 are supported by diametrically-opposed ring steps or stages at the outer circumference of shaft 16, and by the inner circumference of reel 4, such that reel 4 illustrated in FIG. 2 is prevented from moving axially to the left with respect to shaft 16. A normally open grip roller and expanding friction clutch 17 is radially arranged between shaft 16 and the inner circumference of reel 4, the grip rollers of the expanding friction clutch only changing into their clamping position and coupling shaft 16 to reel 4 illustrated in a rotatably fixed manner, in response to the reel rotating comparatively rapidly with respect to shaft 16 in the extraction direction of the belt positioned on reel 4.

A sleeve part 18 is rigidly mounted to an end piece of shaft 16, the sleeve part having a left outer-circumference segment illustrated in FIG. 2, which possesses axial ribs which interact with a diametrically oppositely ribbed, inner circumference of a belt pulley 19 forming the output of transmission 9 (cf. FIG. 1), such that belt pulley 19 is supported on sleeve part 18, and therefore on shaft 16, in a rotatably fixed, though axially movable manner.

In addition, a ring piece 20 is screwed onto a threaded section of sleeve part 18, the ring piece being used as a sleeve-attached retainer of a spring arrangement 21, which is made of two annular cup springs in the example illustrated and tries to push belt pulley 19 away from ring piece 20, i.e., belt pulley 19 is held axially against reel 4.

Circular ball paths having locking depressions for locking balls 22 are arranged on diametrically opposed end faces of reel 4 and belt pulley 9. The spring forces, which are applied by spring arrangement 21 and axially hold belt pulley 19 against reel 4, try to hold balls 22 in locking engagement in the locking depressions of the circular ball paths.

Accordingly, reel 4 and belt pulley 19 are interconnected by locking balls 22, using click-stop or locking engagement, so that a torque limited by the locking forces may be transmitted between reel 4 and belt pulley 19. If this torque is exceeded, locking balls 22 are lifted out of the locking depressions of the circular ball paths on reel 4 and on belt pulley 19, belt pulley 19 executing an axial movement corresponding to the locking depression, in opposition to the force of spring arrangement 21 (to the right illustrated in FIG. 2).

The coupling of belt pulley 19 to reel 4 via locking balls 22 corresponds to constantly closed clutch 10' illustrated in FIG. 1. Normally opened grip roller and expanding friction clutch 17 corresponds to normally opened clutch 10" illustrated in FIG. 1.

As long as motor 7 (cf. FIG. 1), which is drive-coupled to belt pulley 19, is run at lower power, only, at most, small rotational-speed differences may occur between shaft 16 and reel 4, with the result that grip roller and expanding friction clutch 17 remains open, and only the locking of belt pulley 19 to reel 4 by locking balls 22 is effective. Consequently, a small torque may be transmitted, on one hand, by motor 7 to reel 4. On the other hand, reel 4 may be rotated with respect to belt pulley 19, by overcoming the locking resistance.

As soon as motor 7 is switched over to high power, it drives belt pulley 19 at a high rotational speed in such a manner, that high rotational-speed differences occur at least temporarily between shaft 16 and reel 4 and grip roller and expanding friction clutch 17 closes. This may allow the above-mentioned, reversible belt tightening to occur.

Grip roller and expanding friction clutch 17 is an example of a so-called gradient clutch, which closes in response to a predefined threshold value of the rotational-speed differences being exceeded.

Other clutches may also be used in place of a gradient clutch. For example, it is possible to use an electrically controlled release clutch, which is switched into its closed state simultaneously to motor 7 being switched over to high power, and otherwise assumes its opened state.

In addition, it is possible to replace the two clutches 10' and 10" with a single clutch, which may be switched over from a normal state of low force transmission or low transmittable torque to a special state of very high force transmission or very high transmittable torque.

As a variant of the example embodiment illustrated in the drawing, a clutch 10" may also be used, which closes in response to the drive shaft rotating in the winding-up direction. This rotation first occurs when clutch 10' slips and rotation occurs between the input side and power take-off side of clutch 10'.

What is claimed is:

1. A belt tensioner of a seat belt for an occupant on a seat in a vehicle, comprising:

a retraction device configured to automatically shorten the belt;

an extraction lock configured to act in accordance with predetermined parameters;

an irreversible tensioning device configured to irreversibly tighten the belt with a powerful force to maintain a desired sitting position of the occupant for a short period of time in response to receipt of a crash signal generated by a sensory system;

two parallel clutches; and a retraction motor configured to operate and drive the retraction device, the retraction device one of connected and connectable to the retraction motor by the two parallel clutches, the retraction motor switchable between two power ranges;

wherein a first one of the clutches is configured to operate with a constant limited frictional connection to transmit one of a small force and a small torque and a second one of the clutches is arranged as a normally-open clutch and configured to close in response to a high-power range of the retraction motor switched on.

2. The belt tensioner according to claim 1, wherein the vehicle includes a motor vehicle.

3. The belt tensioner according to claim 1, wherein the predetermined parameters include at least one of a predetermined acceleration of the vehicle, a predetermined acceleration of a body of the vehicle, a predetermined deceleration of the vehicle, a predetermined deceleration of the body of the vehicle and an exceeding of a predetermined extraction speed of the belt.

4. The belt tensioner according to claim 1, wherein the force applied by the irreversible tensioning device is approximately 4000 N.

5. The belt tensioner according to claim 1, wherein the period of time is between approximately 10 ms and approximately 15 ms.

6. The belt tensioner according to claim 1, wherein the signal includes an airbag activation signal.

7. The belt tensioner according to claim 1, wherein the retraction motor is configured to automatically switch on the high-power range in response to an occurrence of a danger signal.

8. The belt tensioner according to claim 1, wherein in a low-power range, the retraction motor is controllable as a function of parameters and set to a predetermined minimum power in accordance with an indication from signals of the sensory system that the occupant one of is sitting in a desired position and has not changed a sitting position for a predetermined time span.

9. The belt tensioner according to claim 1, wherein in a low power stage, the retraction motor is controllable as a function of parameters and is configured to be set to a predetermined increased power when the belt is one of moved and pulled out.

10. The belt tensioner according to claim 1, wherein the first one of the clutches includes a clutch input and a clutch output, the clutch input and the clutch output lockable into each other.

11. The belt tensioner according to claim 10, wherein the clutch input and the clutch output of the first clutch comprise:

two wheels held against each other by a spring force; and one of locking elements and balls clamped between the two wheels, the one of the locking elements and balls guided in diametrically opposed circular ball paths in the two wheels and sinkable in locking depressions arranged in the ball paths.

12. The belt tensioner according to claim 1, wherein the second one of the clutches includes a gradient clutch.

13. The belt tensioner according to claim 12, wherein the second one of the clutches is arranged as a normally open grip roller and expanding friction clutch.

14. The belt tensioner according to claim 1, wherein the second one of the clutches includes a release clutch configured to close in response to the retraction motor switched over to the high-power range.

15. A belt tensioner of a seat belt for an occupant on a seat in a vehicle, comprising:

a retraction device configured to automatically shorten the belt;

an extraction lock configured to act in accordance with predetermined parameters;

an irreversible tensioning device configured to irreversibly tighten the belt with a powerful force to maintain a desired sitting position of the occupant for a short period of time in response to receipt of a crash signal generated by a sensory system;

two parallel clutches that operate without engaging a gear arrangement; and a retraction motor configured to operate and drive the retraction device, the retraction device one of connected and connectable to the retraction motor by the two parallel clutches, the retraction motor switchable between two power ranges;

wherein a first one of the clutches is configured to operate with a constant limited frictional connection to transmit one of a small force and a small torque and a second one of the clutches is arranged as a normally-open clutch and configured to close in response to a high-power range of the retraction motor switched on.

* * * * *